(12) United States Patent
Suzuki

(10) Patent No.: US 11,611,667 B2
(45) Date of Patent: Mar. 21, 2023

(54) IMAGE FORMING APPARATUS THAT MANAGES USE STATUS

(71) Applicant: KYOCERA Document Solutions Inc., Osaka (JP)

(72) Inventor: Atsushi Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/699,004

(22) Filed: Mar. 18, 2022

(65) Prior Publication Data

US 2022/0311875 A1 Sep. 29, 2022

(30) Foreign Application Priority Data

Mar. 26, 2021 (JP) .............................. JP2021-054032

(51) Int. Cl.
*H04N 1/00* (2006.01)
*G06F 3/12* (2006.01)
*G06K 15/02* (2006.01)

(52) U.S. Cl.
CPC ..... *H04N 1/00079* (2013.01); *H04N 1/00037* (2013.01); *H04N 1/00068* (2013.01); *H04N 1/00344* (2013.01); *H04N 1/00408* (2013.01); *H04N 1/00832* (2013.01); *H04N 1/00896* (2013.01)

(58) Field of Classification Search
None
See application file for complete search history.

(56) References Cited

U.S. PATENT DOCUMENTS

| 6,476,728 | B1 | 11/2002 | Sakakibara |
| 2005/0216514 | A1 | 9/2005 | Murata |
| 2007/0088944 | A1* | 4/2007 | Nakai ..................... G03G 15/50 713/100 |
| 2017/0060495 | A1* | 3/2017 | Awatsu ................. G06F 3/0482 |
| 2022/0057973 | A1* | 2/2022 | Saito .................... G06Q 10/087 |

FOREIGN PATENT DOCUMENTS

| JP | 2000214186 A | 8/2000 |
| JP | 2003186361 A | 7/2003 |
| JP | 2004280169 | * 10/2004 ............... G06F 3/12 |
| JP | 2005271317 A | 10/2005 |

(Continued)

*Primary Examiner* — Beniyam Menberu
(74) *Attorney, Agent, or Firm* — IP Business Solutions, LLC

(57) ABSTRACT

An image forming apparatus includes a control device. The control device acts, when a built-in processor executes a control program, as a decider that decides whether the image forming apparatus has been used for business, depending on whether the terminal device that has requested a job to the image forming apparatus, or is to receive an output from the image forming apparatus, is registered in advance as a device for business use, or a device for private use, a used time detector that detects a time decided by the decider to have been used for business by the image forming apparatus, with respect to each of operation modes, and a transmitter that transmits information indicating the time used for business, with respect to each of the operation modes, detected by the used time detector, to a management computer installed in an office, through a network I/F.

8 Claims, 7 Drawing Sheets

(56) References Cited

FOREIGN PATENT DOCUMENTS

| | | | | |
|---|---|---|---|---|
| JP | 2012065162 A | | 3/2012 | |
| JP | 2014049059 | * | 3/2014 | ............... H04N 1/00 |
| JP | 2017045093 | * | 3/2017 | ............. G06F 21/62 |
| JP | 2017162340 A | | 9/2017 | |
| KR | 101788054 | * | 10/2017 | ............. G06F 3/038 |

* cited by examiner

Fig.3A

| | |
|---|---|
| SLEEP IN: 2020.11.1 00:00:00 CONTINUE | ~L1 |
| SLEEP OUT: 2020.11.2 10:04:20 10.34.128.12 | ~L2 |
| PRINT: 2020.11.2 10:06:50 10.34.128.12 MONO A4 10PAGE | ~L3 |
| SLEEP IN: 2020.11.2 10:07:50 | ~L4 |
| SLEEP OUT: 2020.11.3 15:10:15 10.34.128.11 | ~L5 |
| PRINT: 2020.11.3 15:11:35 10.34.128.11 COLOR A4 3PAGE | ~L6 |
| SLEEP IN: 2020.11.3 15:12:35 | ~L7 |
| ... | |
| SLEEP OUT: 2020.11.30 23:59:59 LOG OUT | ~LN |

Fig.3B

| | |
|---|---|
| SLEEP MODE CONTINUED: 2020.11.1 00:00:00 | ~L1 |
| RECOVERED FROM SLEEP MODE: 2020.11.2 10:04:20<br>　└BY: IP ADDRESS 10.34.128.12 | ~L2 |
| PRINTING FINISHED: 2020.11.2 10:06:50<br>　└BY: IP ADDRESS 10.34.128.12 B/W, A4, 10 PAGES | ~L3 |
| SLEEP MODE ENTERED: 2020.11.2 10:07:50 | ~L4 |
| RECOVERED FROM SLEEP MODE: 2020.11.3 15:10:15<br>　└BY: IP ADDRESS 10.34.128.11 | ~L5 |
| PRINTING FINISHED: 2020.11.3 15:11:35<br>　└BY: IP ADDRESS 10.34.128.11 COLOR, A4, 3 PAGES | ~L6 |
| SLEEP MODE ENTERED: 2020.11.3 15:12:35 | ~L7 |
| ... | |
| RECOVERED FROM SLEEP MODE (LOG OUT):2020.11.30 23:59:59 | ~LN |

Fig.5

| STATUS | | |
|---|---|---|
| STATUS A | BUSINESS | USED TIME T1 IN WORKING MODE |
| STATUS B | BUSINESS | USED TIME T2 IN STANDBY MODE |
| STATUS C | PRIVATE | USED TIME IN WORKING MODE |
| STATUS D | PRIVATE | USED TIME IN STANDBY MODE |
| STATUS E | ELAPSED TIME T3 IN SLEEP MODE | |

POWER ON

IMAGE FORMING APPARATUS THAT MANAGES USE STATUS

INCORPORATION BY REFERENCE

This application claims priority to Japanese Patent Application No. 2021-054032 filed on Mar. 26, 2021, the entire contents of which are incorporated by reference herein.

BACKGROUND

The present disclosure relates to an image forming apparatus that enables a use status thereof to be managed.

A technique 1 is known including installing a power consumption management apparatus, for managing the power consumption of electric appliances connected thereto, in a home office, and notifying the cumulative power consumption of each of the electric appliances from the power consumption management apparatus to outside (e.g., managing computer installed in the main office of a company) through a communication line, thereby enabling the company to recognize the power consumption at the home office.

A technique 2 is also known, including saving only necessary information in an appropriate format, when saving information related to an image processing that has been done, in a form of counter information (e.g., number of used sheets or electricity usage), thereby suppressing an increase in memory capacity.

Another known technique 3 includes encouraging the user to be more energy-conscious, by making the user aware of the number of sheet that can be saved by performing duplex printing instead of simplex printing.

Further, a known technique 4, related to an image forming system configured to aggregate the number of printed sheets with respect to each group, includes setting up group information using random numbers, to prevent an improper arrangement among the groups.

Still further, a technique 5 to separately count the power consumption originating from telework (work from home), and the power consumption originating from private use, is known.

SUMMARY

The disclosure proposes further improvement of the foregoing techniques.

In an aspect, the disclosure provides an image forming apparatus connectable to a terminal device. The image forming apparatus includes a communication device and a control device. The communication device enables data communication with outside. The control device includes a processor, and acts as a decider, a used time detector, and a transmitter, when the processor executes a control program. The decider decides whether the image forming apparatus has been used for business, depending on whether the terminal device that has requested a job to the image forming apparatus, or that is to receive a product outputted from the image forming apparatus, is registered in advance as a device for business use, or as a device for private use. The used time detector detects a time decided by the decider to have been used for business by the image forming apparatus, with respect to each of operation modes. The transmitter transmits information indicating the time used for business with respect to each of the operation modes, detected by the used time detector, to a management apparatus registered in advance, through the communication device.

BRIEF DESCRIPTION OF THE DRAWINGS

FIG. 3A is a schematic drawing showing an example of a log stored in a log storage device;

FIG. 3B is a schematic drawing for explaining the content of the log shown in FIG. 3A;

FIG. 5 is a table showing an example of a status where the power to the image forming apparatus is on;

DETAILED DESCRIPTION

Figure 1:
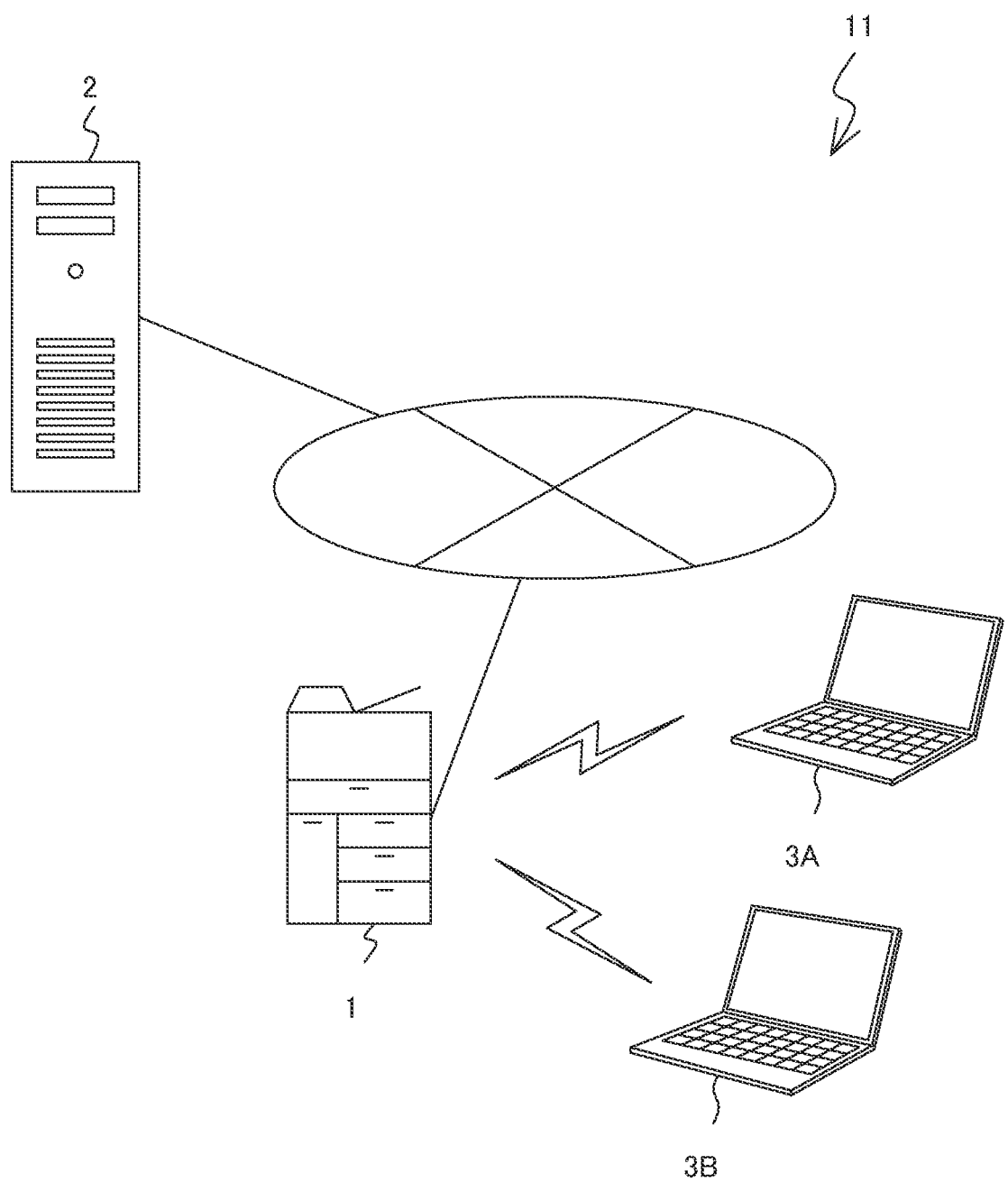
FIG. 1 is a schematic diagram showing a general configuration of a management system including an image forming apparatus according to a first embodiment of the disclosure.

Hereafter, an image forming apparatus according to some embodiments of the disclosure will be described, with reference to the drawings. FIG. 1 is a schematic diagram showing a general configuration of a management system including an image forming apparatus according to a first embodiment of the disclosure.

The management system 11 includes the image forming apparatus 1 installed in a home office, such as a worker's own home, located on, for example, the internet, a management apparatus 2 installed in a main office, such as a company office, and terminal devices 3A and 3B (hereinafter simply "terminal device 3", where appropriate) connected to the image forming apparatus 1 by wire or wirelessly. The image forming apparatus 1 is a multifunction peripheral having a plurality of functions, such as copying, printing, scanning, and facsimile transmission. The management apparatus 2 is, for example, a server. The terminal device 3 is a personal computer for example, which can instruct the image forming apparatus 1 to execute a printing job, or receive a product (scanned data) outputted from the image forming apparatus 1.

Figure 2:
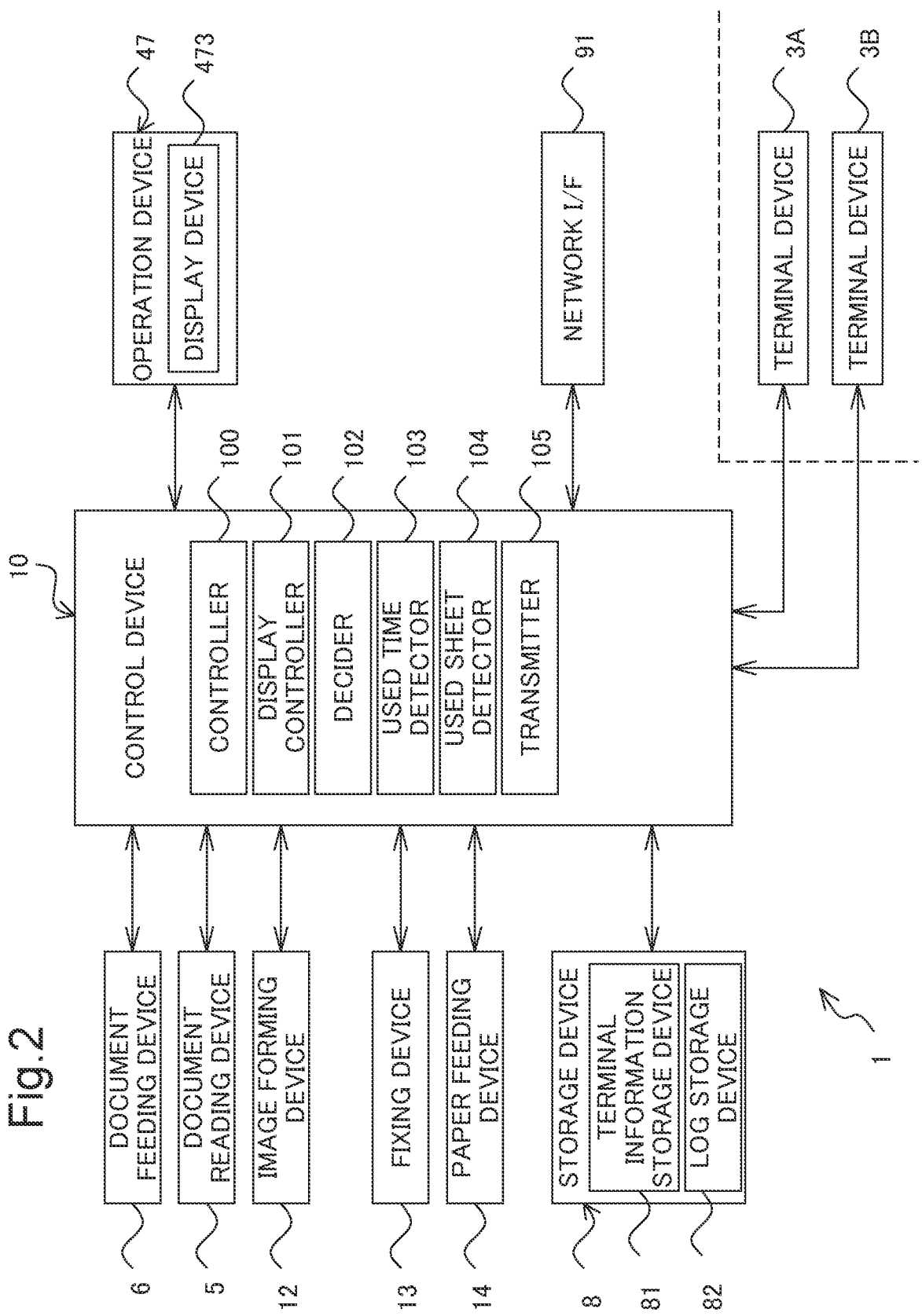
FIG. 2 is a functional block diagram schematically showing an essential internal configuration of the image forming apparatus according to the first embodiment.

FIG. 2 is a functional block diagram schematically showing an essential internal configuration of the image forming apparatus according to the first embodiment. The image forming apparatus 1 includes a control device 10, a document feeding device 6, a document reading device 5, an image forming device 12, a fixing device 13, a paper feeding device 14, a storage device 8, an operation device 47, and a network interface (I/F) 91. The image forming apparatus 1 is also connectable to the terminal devices 3A and 3B, via wire or wirelessly.

The document feeding device 6 is openably connected to the upper face of the document reading device 5, via a non-illustrated hinge, and serves as a document retention cover, when the document reading device 5 reads a source document placed on a non-illustrated platen glass. The document feeding device 6 is an automatic document feeder (ADF) including a non-illustrated document tray, and delivers the source documents placed on the document tray to the document reading device 5.

To perform a document reading operation, the image forming apparatus 1 operates as follows. The document reading device 5 optically reads the image on a source document delivered from the document feeding device 6 to the document reading device 5, or placed on the platen glass, and generates image data. The image data generated by the document reading device 5 is stored, for example, in a non-illustrated image memory.

To perform the image forming operation, the image forming apparatus 1 operates as follows. The image recording device 12 forms a toner image on a recording sheet, serving as a recording medium, delivered from the paper feeding device 14, on the basis of the image data generated through the document reading operation, the image data stored in the image memory, or image data received from a computer connected via a network.

The fixing device 13 heats and presses the recording sheet on which the toner image has been formed by the image forming device 12, to thereby fix the toner image onto the recording sheet, and the recording sheet that has undergone the fixing process is delivered to a non-illustrated output tray. The paper feeding device 14 includes a paper cassette.

The storage device 8 is, for example, a hard disk drive (HDD) or a solid state drive (SSD), containing various types of control programs. The storage device 8 also includes a terminal information storage device 81 and a log storage device 82. In the terminal information storage device 81, an IP address assigned to the terminal device 3 to be used for business (e.g., personal computer lent from the company). The IP address can be registered by the user, for example through the operation device 47. When the IP address is inputted through the operation device 47, a controller 100 to be subsequently described stores the IP address in the terminal information storage device 81.

For example, when an IP address "10.34.128.11" is assigned to the terminal device 3A and an IP address "10.34.128.12" is assigned to the terminal device 3B, and the IP address "10.34.128.12" is stored in the terminal information storage device 81, the terminal device 3B is registered as the device for business use, in the image forming apparatus 1.

In the log storage device 82, logs indicating the events that have occurred in the image forming apparatus 1 are stored. When an event occurs, the controller 100 stores the log indicating the event, in the log storage device 82.

FIG. 3A is a schematic drawing showing an example of a log stored in the log storage device 82, and FIG. 3B is a schematic drawing for explaining the content of the log shown in FIG. 3A.

The image forming apparatus 1 is configured to operate in a working mode, a standby mode, and a sleep mode. The working mode refers to the mode in which the image forming apparatus 1 executes a copying operation, a scanning operation, and so forth, according to an execution instruction inputted. In the standby mode, power supply is maintained to predetermined components after the working mode, such as the printing operation, is finished, so that, for example, the image forming operation can be immediately started when the user inputs the instruction. The sleep mode refers to an energy saving mode, in which the power supply to the predetermined components is shut off, and the image forming apparatus 1 is standing by for an input of a new instruction. The image forming apparatus 1 enters the sleep mode, when an execution instruction has not been inputted for a predetermined period of time. The controller 100 decides in which mode the image forming apparatus 1 is, for example on the basis of the operation status and power supply status of the image forming apparatus 1.

In the log storage device 82, a log L1 to Ln are stored. For example, "Sleep IN: 2020.11.1 00:00:00 Continue" is stored as the log L1, and "Sleep Out: 2020.11.2 10:04:20 10.34.128.12" is stored as the log L2, in the log storage device 82.

The log L1 indicates, as shown in the first item in FIG. 3B, that the sleep mode has been maintained at the time point "2020.11.1 00:00:00", from the time "10.31 23.59.59" at which a standby time until entering the sleep mode has elapsed (in this example, standby time duration is 1 minute), after the time that the standby mode finished the day before, stored as a log preceding the log L1 shown in FIG. 3A. The log L2 indicates, as shown in the second item in FIG. 3B, that the sleep mode was over at "2020.11.2 10:04:20", because of an action of the terminal device 3B, to which the IP address "10.34.128.12" is assigned.

Further, from the logs L2 to L4 stored in the log storage device 82, it is apparent that the printing operation (B/W printing on 10 pages of A4 sheets) was performed for 2 minutes and 30 seconds, from "2020.11.2 10.04.20" to "10.06.50", according to the instruction from the terminal device 3B to which the IP address "10.34.128.12" is assigned, and that the sleep mode was entered from "10.07.50", after 1 minute of standby time (standby mode) elapsed.

The operation device 47 receives instructions from the user to execute the functions and operations that the image forming apparatus 1 is configured to perform, such as an image forming operation. The operation device 47 includes a display unit 473 for displaying, for example, an operation guide for the user. The operation device 47 also receives, through a touch panel provided on the display device 473, an input of a user's instruction based on an operation performed by the user on the operation screen of the display device 473 (touch operation).

The display device 473 includes, for example, a liquid crystal display (LCD). The display device 473 includes the touch panel. When the user touches a button or a key displayed on the screen, the touch panel receives the instruction corresponding to the touched position.

The network I/F 91 is a communication interface that transmits and receives various types of data to and from external devices inside a local area, or on the internet (e.g., management apparatus 2). The network I/F 91 exemplifies the communication device in the disclosure.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control device 10 includes a controller 100, a display controller 101, a decider 102, a used time detector 103, a used sheet detector 104, and a transmitter 105.

The control device 10 acts as the controller 100, the display controller 101, the decider 102, the used time detector 103, the used sheet detector 104, and the transmitter 105, when the processor operates according to a control program stored in the storage device 8. Here, the controller 100 and the related components may each be constituted in the form of a hardware circuit, instead of being performed according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the paper feeding device 14, the storage device 8, the operation device 47, the network I/F 91, and the terminal devices 3A and 3B, and controls the operation of the mentioned components. For example, the controller 100 controls the image forming device 12, so as to form the source image acquired through the reading operation by the document reading device 5, on the recording sheet serving as the recording medium.

The display controller 101 controls the displaying operation of the display device 473. For example, the display controller 101 causes the display device 473 to display an operation screen for receiving an input of the user.

The decider 102 decides whether the image forming apparatus 1 has been used for business, depending on whether the terminal device 3 that has requested a job to the image forming apparatus 1, or that is to receive a product outputted from the image forming apparatus 1, is registered in advance as a device for business use, or as a device for private use.

To be more detailed, the decider 102 decides whether the image forming apparatus 1 has been used for business, by deciding whether the IP address, assigned to the terminal device 3 that has requested a job (e.g., printing job) to the image forming apparatus 1, or that is to receive a product outputted from the image forming apparatus 1 (e.g., scanned data), is registered in the terminal information storage device 81.

In the terminal information storage device 81, the IP address assigned to the terminal device to be used for business (e.g., personal computer lent from the company) is stored. Therefore, when the IP address assigned to the terminal device 3 that has requested the job or is to receive the product is stored in the terminal information storage device 81, the decider 102 decides that the image forming apparatus 1 has been used for business.

For example, the decider 102 decides whether the image forming apparatus 1 has been used for business, by detecting the IP address "10.34.128.12" of the terminal device 3 that has requested the printing job, from the log L3 shown in FIG. 3A, and then deciding whether the detected IP address is stored in the terminal information storage device 81. In this case, since the IP address "10.34.128.12" is stored in the terminal information storage device 81, the decider 102 decides that the image forming apparatus 1 has been used for business.

Here, as another embodiment, the IP address "10.34.128.11" assigned to the terminal device 3A to be used for a private purpose, not for business, may be stored in the terminal information storage device 81. In this case, the IP address assigned to the terminal device 3 that has requested the job or is to receive the product is not stored in the terminal information storage device 81. Therefore, the decider 102 decides that the image forming apparatus 1 has been used for business.

The used time detector 103 detects the time decided by the decider 102 to have been used for business, with respect to each of the operation modes, and also detects the elapsed time in the sleep mode. To be more detailed, the used time detector 103 analyzes the logs stored in the log storage device 82 to thereby detect the transition of the modes, and calculates the time from the preceding mode transition to the mode transition just detected (i.e., elapsed time in the immediately preceding mode).

For example, the used time detector 103 detects the recovery from the sleep mode (transition from sleep mode to working mode) from the log L2, and then detects the elapsed time in the sleep mode "34:4:20" from the logs L1 and L2.

The used time detector 103 detects the finish of the printing job (transition from working mode to standby mode) from the log L3, and then detects the elapsed time "2:30" in the working mode from the logs L2 and L3, as the used time in the working mode. Further, the used time detector 103 detects that the sleep mode has been entered (transition from standby mode to sleep mode) from the log L4, and detects the elapsed time "1 minute" in the standby mode from the logs L3 and LA, as the used time in the standby mode.

The used sheet detector 104 detects the number of sheets decided by the decider 102 to have been used for business. To be more detailed, the used sheet detector 104 analyzes the logs stored in the log storage device 82, corresponding to the working mode decided by the decider 102 to have been performed for business, to thereby detect the number of used sheets. For example, the used sheet detector 104 detects the number of used sheets "10 pages", from the log L3.

The transmitter 105 transmits information indicating the time used for business with respect to each of the modes, detected by the used time detector 103, information indicating the elapsed time in the sleep mode, and information indicating the number of sheets used for business, detected by the used sheet detector 104, to the management apparatus 2 through the network I/F 91.

Referring now to a flowchart shown in FIG. 4, an example of operations performed by the control device 10 of the image forming apparatus 1 according to the first embodiment will be described hereunder. This operation is performed at a predetermined date and time of the month, in other words periodically performed once a month.

The controller 100 initializes cumulative used times T1_SUM and T2_SUM, a cumulative elapsed time T3_SUM, and a cumulative number of used sheets C1_SUM to "0" (S1). The used time detector 103 analyzes the logs of the previous month stored in the log storage device 82, to thereby detect the transition of the modes (S2), and decides which of the working mode, the standby mode, and the sleep mode corresponds to the immediately preceding mode (S3).

For example, the used time detector 103 decides that the immediately preceding mode was the sleep mode, upon detecting the mode transition from the log L2, L5, or Ln, decides that the immediately preceding mode was the working mode, upon detecting the mode transition from the log L3 or L6, and decides that the immediately preceding mode was the standby mode, upon detecting the mode transition from the log L4 or L7.

When the used time detector 103 decides that the immediately preceding mode was the working mode ("Working Mode" at S3), the decider 102 decides whether the working mode was performed for business (S4).

When the decider 102 decides that the working mode was performed for business (YES at S4), the used time detector 103 calculates the elapsed time in the immediately preceding mode as the used time T1 in the working mode (S5), and adds the calculated used time T1 to the cumulative used time T1_SUM (S6).

Then the used sheet detector 104 detects the number of used sheets C1 in the mentioned working mode (S7), and adds the detected number of used sheets C1 to the cumulative number of used sheets C1_SUM (S8). Thereafter, the operation proceeds to S14. In contrast, when the decider 102 decides that the working mode was not performed for business (NO at S4), the operation immediately proceeds to S14.

When the used time detector 103 decides at S3 that the immediately preceding mode was the standby mode ("Standby Mode" at S3), the decider 102 decides whether the standby mode was performed for business (S9).

When the decider 102 decides that the standby mode was performed for business (YES at S9), the used time detector 103 calculates the elapsed time in the immediately preceding mode as the used time T2 in the standby mode (S10), and adds the calculated used time T2 to the cumulative used time T2_SUM (S11). Thereafter, the operation proceeds to S14. In contrast, when the decider 102 decides that the standby mode was not performed for business (NO at S9), the operation immediately proceeds to S14.

When the used time detector 103 decides at S3 that the immediately preceding mode was the sleep mode ("Sleep Mode" at S3), the used time detector 103 calculates the elapsed time in the immediately preceding mode as the elapsed time T3 in the sleep mode (S12), and adds the calculated elapsed time T3 to the cumulative elapsed time T3_SUM (S13). Thereafter, the operation proceeds to S14.

At S14, the used time detector 103 decides whether the analysis of the logs of the previous month stored in the log storage device 82 has finished (S14). When the used time detector 103 decides that the analysis has finished (YES at S14), the transmitter 105 transmits information indicating the cumulative used time T1_SUM and T2_SUM, information indicating the cumulative elapsed time T3_SUM, and information indicating the cumulative number of used sheets C1_SUM, to the management apparatus 2 through the network I/F 91 (S15). At this point, the operation is finished. In contrast, when the used time detector 103 decides that the analysis has not finished (NO at S14), the operation returns to S2.

According to the first embodiment, the information indicating the cumulative used time T1_SUM and T2_SUM, respectively corresponding to the working mode and standby mode performed for business, the information indicating the cumulative elapsed time T3_SUM in the sleep mode, and the information indicating the cumulative number of used sheets C1_SUM used for business, are transmitted to the management apparatus 2. Therefore, the expenses originating from the business can be controlled by the managing side, for example the company, apart from the private use.

In addition, the decision whether the image forming apparatus 1 was used for business, or for a private purpose, is made by the terminal device that is the requester of the job (e.g., printing job), or the receiver of the outputted product (e.g., scanned data). Such an arrangement exempts the user from troublesome operations, unlike the existing apparatuses. Therefore, the expenses originating from the business can be controlled by the managing side, such as the company, without the need to impose troublesome operations on the user.

Here, although the power consumption by the image forming apparatus 1 differs depending on the mode (e.g., working mode or standby mode), the power consumption in each of the modes is known in advance. Therefore, the management apparatus 2 can calculate the power consumption, on the basis of the used time for each mode.

For example, when the power consumption in the working mode (e.g., printing operation) is "1200 W", and the power consumption in the standby mode is "90 W", the power consumption for 3 minutes of printing operation and one minute of standby mode, totally 4 minutes, can be calculated as 61.5 Wh (=1200×3÷60+90×1÷60). In addition, the electricity charge can be calculated, from the power consumption. For example, when the electricity charge for 1 kWh is 40 yen, the electricity charge for the power consumption of 61.5 Wh is 2.46 yen (=40×61.5÷1000).

Here, the used time detector 103 may calculate the power consumption on the basis of the cumulative used time T1_SUM and T2_SUM, and the cumulative elapsed time T3_SUM, and the used time detector 103 may transmit the calculated power consumption to the management apparatus 2 through the network I/F 91, instead of, or in addition to, the cumulative used time T1_SUM and T2_SUM, and the cumulative elapsed time T3_SUM. For example, the used time detector 103 may calculate the power consumption, by multiplying the cumulative elapsed time of each mode by a predetermined coefficient for the corresponding mode.

Regarding the sleep mode, the used time detector 103 may calculate the power consumption, when a transmission instruction is inputted through the operation device 47, and the used time detector 103 may transmit the power consumption to the management apparatus 2. In this case, the management apparatus 2 can perform such account processing as adding up the power consumption in the sleep mode as the power consumption for business, when the power consumption in the sleep mode is received from the image forming apparatus 1, but not adding up the power consumption in the sleep mode as the power consumption for business, when the power consumption in the sleep mode is not received from the image forming apparatus 1.

Further, whether the image forming apparatus 1 was used for business, or for a private purpose, is decided by the terminal device 3 that is the requester of the job (e.g., printing job), or the receiver of the outputted product (e.g., scanned data). Such an arrangement exempts the user from troublesome operations, unlike the existing apparatuses. Therefore, the expenses originating from the business can be controlled by the managing side, such as the company, without the need for the user to perform troublesome operations. To transmit the mentioned information to the management apparatus 2, the information may be transmitted, for example, via e-mail to the computer being used by the manager.

FIG. 5 is a table showing an example of the status where the power to the image forming apparatus 1 is on. The power-on status can be classified into status A to E as shown in FIG. 5. The status A represents the used time T1 in the working mode for business use, the status B represents the used time T2 in the standby mode for business use, the status C represents the used time in the working mode private use, the status D represents the used time in the standby mode for private use, and the status E represents the elapsed time T3 in the sleep mode.

According to the first embodiment, the transmitter 105 transmits the information of the time in the status A, B, and E to the management apparatus 2. As another embodiment, the time of the status C and D may be regarded as the time in the sleep mode, and the used time detector 103 may detect the time of the status C, D, and E as the time in the sleep mode.

In this case, the time not used for business is regarded by the manager as the time in the sleep mode. The time of the status C and D is supposed to be included in the elapsed time in the sleep mode, if the image forming apparatus 1 is unused for a private purpose, and therefore the cost sharing between the company and the workers can be more properly managed.

Although the first embodiment is based on the assumption that the image forming apparatus is lent to the worker from the company, an image forming apparatus owned by the worker may be employed. In this case, it is preferable that the transmitter 105 transmits only the information indicating the status A and B to the management apparatus 2, when the power consumption originating from the sleep mode of the status E is to be borne by the worker, and is restricted from transmitting the time information related to the private use.

Recently, a work style called "work from home", in which the worker uses the home as workplace instead of the office of the company, has come to gather attention, and is actually prevailing. In this case, the personal computer may be provided or lent from the company.

In addition, a copier or a multifunction peripheral may also be lent from the company in the near future, to improve the business efficiency. Accordingly, the copier or the like is installed in the worker's home, and the worker may also use the copier for a private purpose, in addition to the business use. In such a case, the distinction of the expenses such as the electricity charge between the business use and the private use may become obscure.

Here, although the technique 1 described above as BACKGROUND enables the company to be informed of the power consumption in the home office, the technique 1 is not designed to distinguish between the business use and the private use.

The technique 2 according to the BACKGROUND refers to saving the information about the electricity usage, but no reference is made to the distinction between the business use and the private use. The technique 3 according to the BACKGROUND refers to a method of energy saving, but no reference is made to the distinction between the business use and the private use.

The technique 4 according to the BACKGROUND refers to the aggregation of the number of printed sheet with respect to each group, but is not based on the situation related to the work from home.

The technique 5 according to the BACKGROUND enables the power consumption originating from the telework (work from home) and the power consumption originating from private use to be separately settled. However, the worker has to press a telework start button when starting the telework, and press a telework finish button upon finishing the telework, which is troublesome to the worker. In addition, the distinction between the telework use and the private use depends on self-report from the worker, and it is not unlikely that the report is manipulated.

In contrast, the arrangement according to the first embodiment, the expenses originating from the business can be controlled separately from the private expenses, by the managing side such as the company, without the need for the user to perform troublesome operations.

Figure 6:
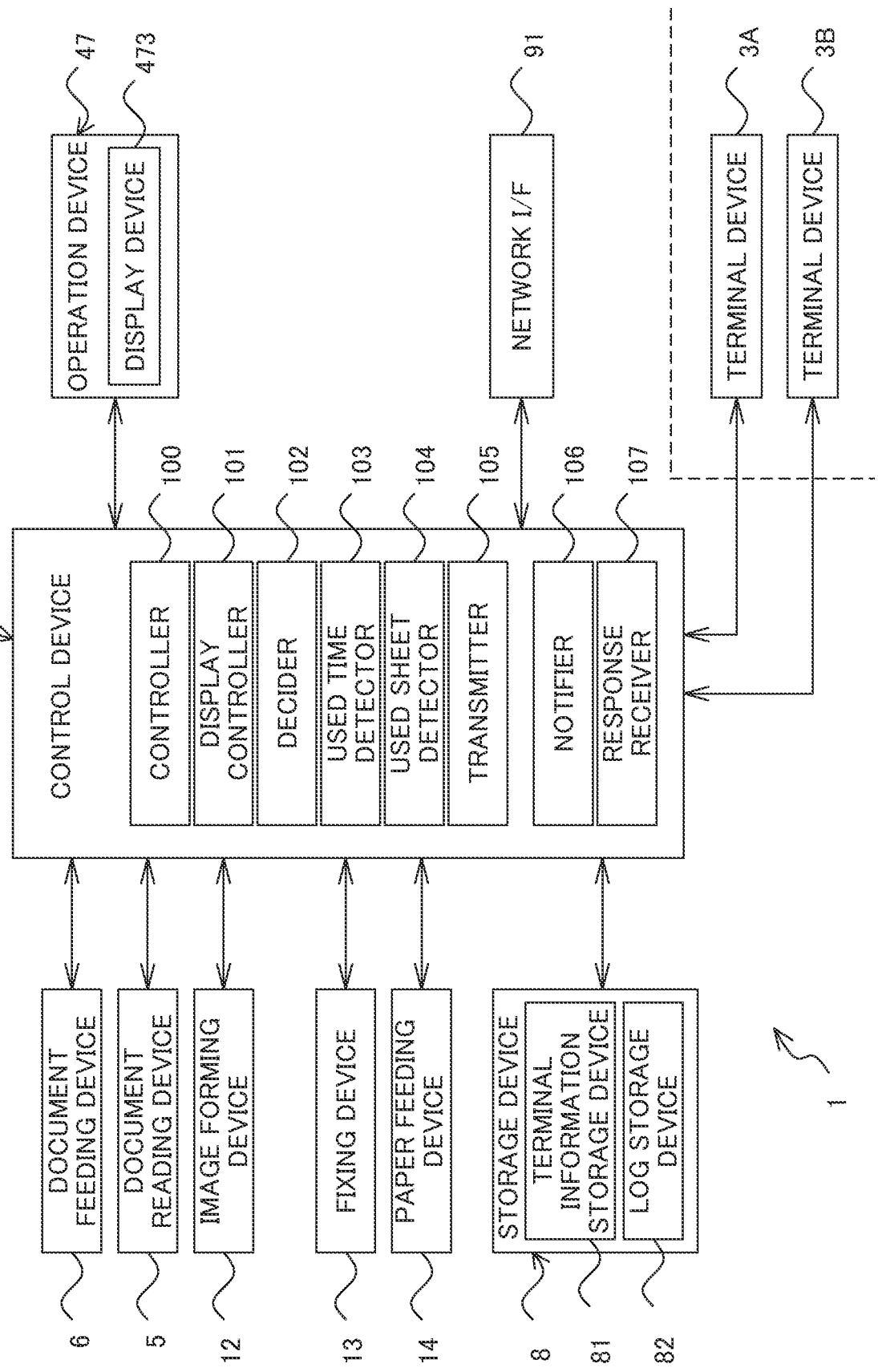
FIG. 6 is a functional block diagram schematically showing an essential internal configuration of an image forming apparatus according to a second embodiment.

FIG. 6 is a functional block diagram schematically showing an essential internal configuration of an image forming apparatus according to a second embodiment. The image forming apparatus according to the second embodiment is different from the image forming apparatus according to the first embodiment shown in FIG. 2, in that the control device 10 further acts as a notifier 106 and a response receiver 107, when the processor executes the control program.

Hereafter, the description of the same elements as those of the first embodiment will not be repeated.

The notifier 106 sends an enquiry to the user about whether the use information based on business, transmitted by the transmitter 105 to the management apparatus 2 (e.g., information indicating the used time in the working mode, information indicating the used time in the standby mode, and the information indicating the number of used sheets), is correct, to the terminal device 3 registered in advance as the device for business use.

Figure 4:
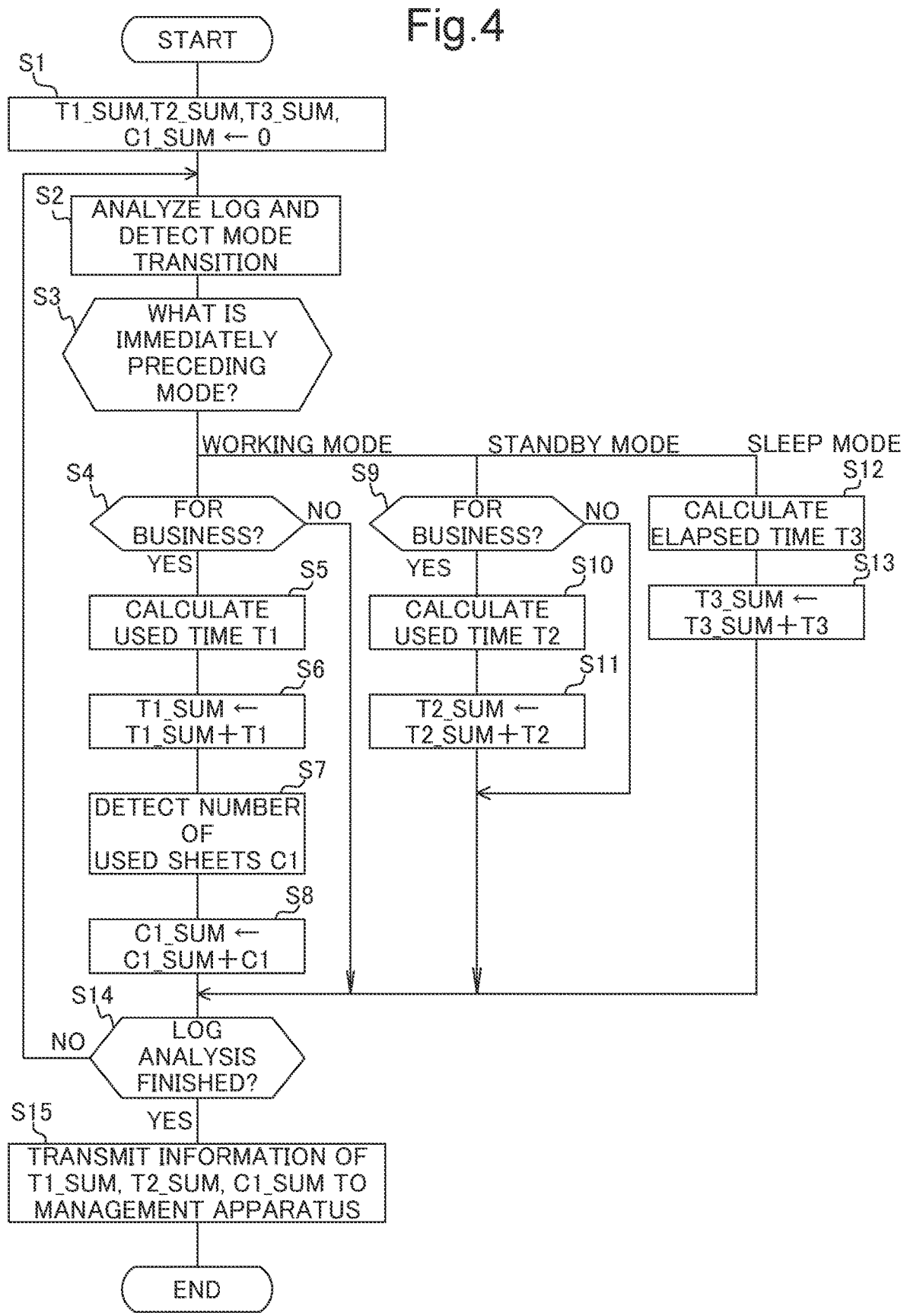
FIG. 4 is a flowchart showing an example of operations performed by a control device of the image forming apparatus according to the first embodiment.

As a specific example, the notifier 106 transmits, after S14 shown in FIG. 4, the information indicating the cumulative used time T1_SUM, the information indicating the cumulative used time T2_SUM, the information indicating the cumulative used time T3_SUM, and the information indicating the cumulative number of used sheets C1_SUM, to the terminal device 3B, the IP address of which is stored in the terminal information storage device 81. Thus, the enquiry about whether the mentioned pieces of information are correct, in other words whether those pieces of information reflect the business use, is sent to the user.

The response receiver 107 receives the user's response to the mentioned enquiry from the notifier 106, transmitted from the terminal device 3.

The transmitter 105 transmits the mentioned use information to the management apparatus 2, only when the response receiver 107 has received the user's response that the use information is correct (reflecting the business use).

According to the second embodiment, the user is given the opportunity to confirm whether the information about the use of the image forming apparatus 1, to be transmitted to the management apparatus 2, is correct (reflecting the business use). Such an arrangement prevents the information that the user disagrees with from being transmitted to the management apparatus 2.

Figure 7:
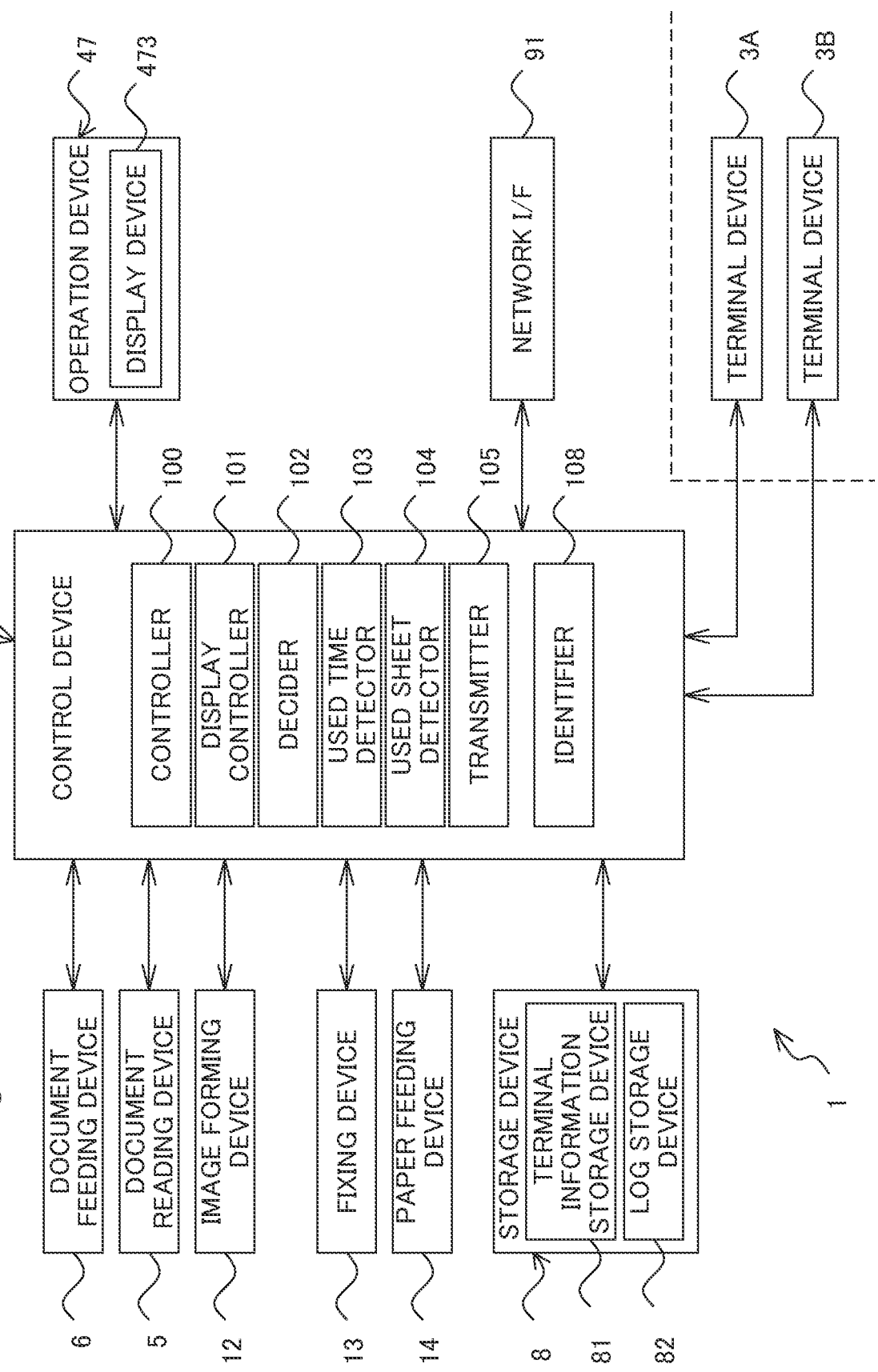
FIG. 7 is a functional block diagram schematically showing an essential internal configuration of an image forming apparatus according to a third embodiment.

FIG. 7 is a functional block diagram schematically showing an essential internal configuration of an image forming apparatus according to a third embodiment. The image forming apparatus according to the third embodiment is different from the image forming apparatus according to the first embodiment shown in FIG. 2, in that the control device 10 further acts as an identifier 108, when the processor executes the control program, and that the display controller 101 causes the display device 473, when the copying operation is executed, to display a message asking the user whether the copying operation is for business or for a private purpose. Hereafter, the description of the same elements as those of the first embodiment will not be repeated.

The identifier 108 identifies, according to the user's response received by the operation device 47, whether the copying operation has been executed for business, or for a private purpose.

The used time detector 103 also detects the used time, corresponding to the use identified as business use by the identifier 108, as the used time decided by the decider 102 to have been used for business.

The mentioned arrangement according to the third embodiment enables the copying operation, which is unable to be distinguished between the business use and the private use, from the requester of the job to the image forming apparatus 1, or the receiver of the product outputted from the image forming apparatus 1 (i.e., the decider 102 is unable to decide whether the copying operation has been performed for business or for a private purpose), to be managed with the distinction between the business use and the private use.

The disclosure may be modified in various manners, without limitation to the configuration according to the foregoing embodiments. Although the image forming apparatus according to the disclosure is exemplified by the multifunction peripheral in the foregoing embodiment, the disclosure may be applied to a different type of image forming apparatus having the printer function.

The configurations and processings according to the foregoing embodiments, described with reference to FIG. 1 to FIG. 7, are merely exemplary and in no way intended to limit the disclosure to those configurations and processings.

While the present disclosure has been described in detail with reference to the embodiments thereof it would be apparent to those skilled in the art the various changes and modifications may be made therein within the scope defined by the appended claims.

What is claimed is:

1. An image forming apparatus connectable to a terminal device, the image forming apparatus comprising:
    a communication device that enables data communication with outside; and
    a control device including a processor, and configured to act, when the processor executes a control program, as:
        a decider that decides whether the image forming apparatus has been used for business in an operation mode, depending on whether the terminal device that has requested a job to the image forming apparatus, or that is to receive a product outputted from the image forming apparatus, is registered in advance as a device for business use, or as a device for private use;
        a used time detector that detects an elapsed time in the operation mode decided by the decider to have been used for business by the image forming apparatus, with respect to each of operation modes; and
        a transmitter that transmits information indicating the elapsed time used for business, with respect to each of the operation modes, detected by the used time detector, to a management apparatus registered in advance, through the communication device.

2. The image forming apparatus according to claim 1, wherein the operation modes include a working mode and a standby mode.

3. The image forming apparatus according to claim 2, wherein the used time detector further detects an elapsed time in a sleep mode which spends less energy than the standby mode, and
    the transmitter also transmits information indicating the elapsed time in the sleep mode,
    to the management apparatus through the communication device.

4. The image forming apparatus according to claim 3, further comprising an operation device that receives an input,
    wherein, in a case of the sleep mode, the used time detector transmits the power consumption in the sleep mode, to the management apparatus through the communication device,
    when a transmission instruction is inputted through the operation device.

5. The image forming apparatus according to claim 2, wherein the used time detector calculates power consumption by multiplying a cumulative elapsed time in each of the modes, by a predetermined coefficient corresponding to the mode, and
    the transmitter transmits the power consumption in each of the modes calculated by the used time detector, to the management apparatus through the communication device.

6. The image forming apparatus according to claim 1, further comprising an image forming device that forms an image on a recording sheet,
    wherein the control device further acts, when the processor executes the control program, as a used sheet detector that detects a number of recording sheets used for image forming by the image forming device, when the decider decides that the image forming is performed for business in an operation mode, and
    the transmitter further transmits information indicating the number of used sheets detected by the used sheet detector, to the management apparatus through the communication device.

7. The image forming apparatus according to claim 1, wherein the control device further acts, when the processor executes the control program, as:
    a notifier that sends an enquiry to a user about whether use information including the information indicating the elapsed time, transmitted by the transmitter to the management apparatus, is for business, to the terminal device registered in advance as the device for business use; and
    a response receiver that receives the user's response to the enquiry, from the terminal device, and
    the transmitter transmits the use information to the management apparatus, only when the response receiver has received the user's response that the use information is correct.

8. The image forming apparatus according to claim 1, further comprising:
    an operation device that receives an input; and
    a display device,
    wherein the control device further acts, when the processor executes the control program, as:
        a display controller that causes the display device, when a copying operation is executed, to display a message asking a user whether the copying operation is for business or for a private purpose; and
        an identifier that identifies, according to the user's response received by the operation device, whether the copying operation has been executed for business, or for a private purpose, and
    the used time detector further detects a used time originating from the copying operation identified as operation for business by the identifier, as the elapsed time in the operation mode decided by the decider to have been used for business.

* * * * *